L. ARNOLD.
Fish-hook Holder.

117,719.　　　　　　　　　　　　　　Patented August 8, 1871.

Witnesses:　　　　　　　　　　Inventor:
E. Wolff.　　　　　　　　　　　L. Arnold.
Francis McArdle　　　　　PER　　　　　
　　　　　　　　　　　　　　　Attorneys.

UNITED STATES PATENT OFFICE.

LEVI ARNOLD, OF BELCHERTOWN, MASSACHUSETTS.

IMPROVEMENT IN FISH-HOOK HOLDERS.

Specification forming part of Letters Patent No. 117,719, dated August 8, 1871.

*To all whom it may concern:*

Be it known that I, LEVI ARNOLD, of Belchertown, in the county of Hampshire and State of Massachusetts, have invented a new and useful Improvement in Fish-Hook Holder; and I do hereby declare that the following is a full, clear, and exact description thereof, which will enable others skilled in the art to make and use the same, reference being had to the accompanying drawing forming part of this specification.

This invention relates to a new and useful improvement in mode of securing fish-hooks to fish-lines or holders; and consists in a grooved stem and ring-slide, arranged to operate as hereinafter more fully described.

Figure 1:
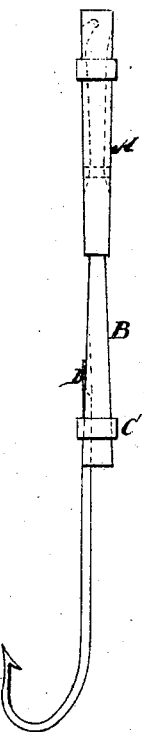
Figure 2:
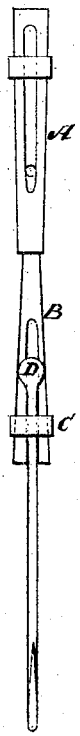
Figure 3:
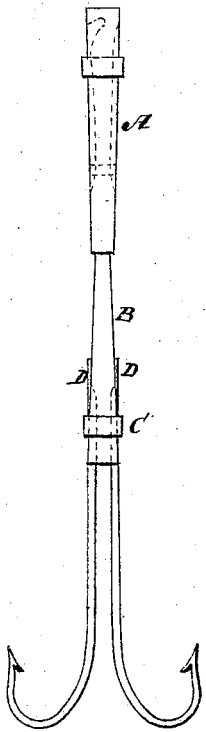

In the accompanying drawing, Figure 1 is a side view, and Fig. 2 a front view, showing a single hook secured according to my invention. Fig. 3 is a side view, showing two hooks secured in the same manner.

Similar letters of reference indicate corresponding parts.

A represents the line-holder, which, being well known and in use, forms no part of my invention. B is the stem, which is rigidly attached to the line or line-holder, as seen in the drawing. This stem is grooved to receive one or more hooks, and is made tapering, or larger in diameter at its outer end than it is where it is joined to the line-holder. At the end of the stem the groove or grooves are designed to be sufficiently deep to receive the stem or stems of the fish-hooks. C is a sliding ring on the stem B. This ring is put on before the stem is attached to the line-holder, its interior diameter being less than that of the outer end of the stem. When the ring is slipped back onto the small portion of the stem B the "flat" D of the hook or hooks may be inserted within the ring, when the ring and the hooks are slipped up until the ring comes in contact with the stem. In this position the flat D prevents the hook from being withdrawn from the ring. A weight on the hook serves to tighten instead of loosen the slide.

I do not confine myself to the use of any particular number of hooks on the stem, nor to any particular mode of connecting the stem B with the line.

Having thus described my invention, I claim as new and desire to secure by Letters Patent—

The sliding ring C, in combination with the tapered stem B provided with a groove or grooves, as shown and described, for the purpose of holding one or more fish-hooks, as specified.

LEVI ARNOLD.

Witnesses:
NATHL. DWIGHT,
LEONARD BARRETT.